May 24, 1927.
J. T. LENN
1,630,125
SHOCK ABSORBER FOR VEHICLE SPRINGS
Filed July 3, 1926
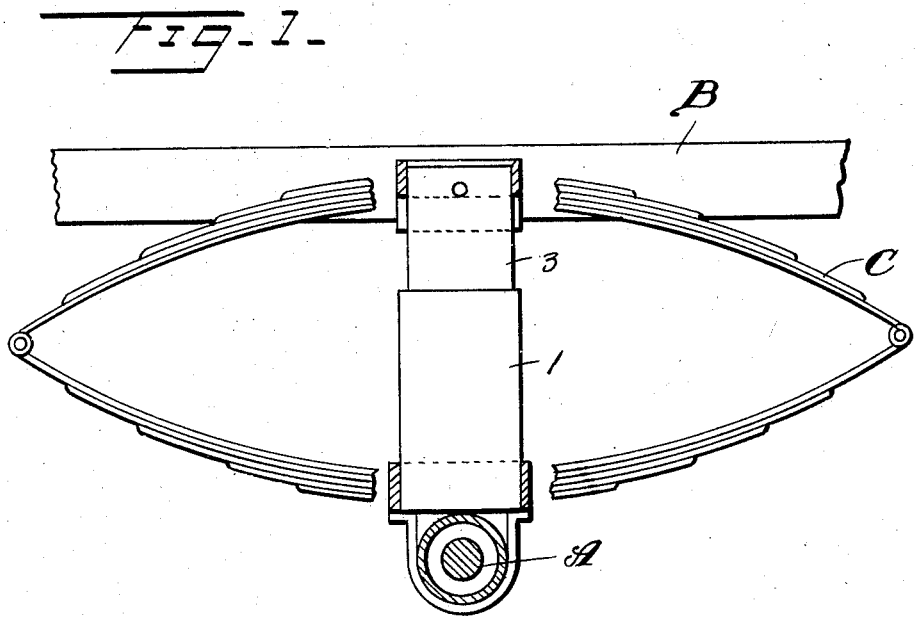
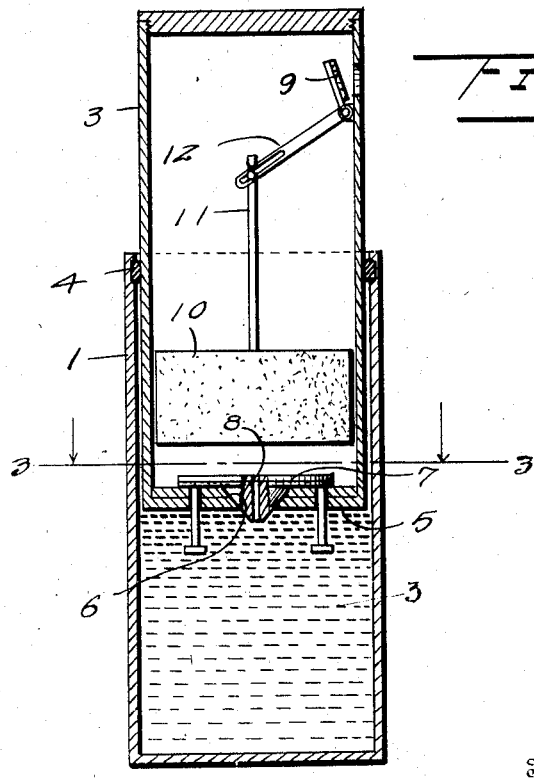
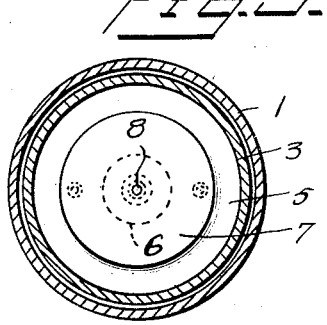
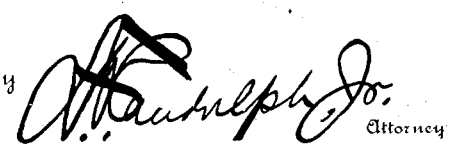

Patented May 24, 1927.

1,630,125

UNITED STATES PATENT OFFICE.

JAMES T. LENN, OF NEWBURGH, INDIANA.

SHOCK ABSORBER FOR VEHICLE SPRINGS.

Application filed July 3, 1926. Serial No. 120,325.

The invention relates to means for adsorbing the shock caused by sudden strain placed on the springs of motor vehicles, and has for its object the provision of a shock absorber comprising telescoping members, one member being adapted to be secured to the running gear of the vehicle, the other member to the body frame, and employing a liquid and air cushion.

The invention will be described in detail hereinafter and will be found illustrated in the accompanying drawings, in which Figure 1 is a fragmental side view of a motor vehicle showing the improved shock absorber applied thereto, Figure 2 is a central vertical sectional view of the shock absorber, and Figure 3 a transverse sectional view on a plane indicated by the line 3—3 of Figure 2.

In the drawings similar reference characters will be used to designate corresponding parts throughout the several views.

In Figure 1 is shown a fragment of a motor vehicle to illustrate the application of the improved shock absorber in which the axle of the vehicle is indicated at A, the body frame at B, and a spring C interposed between the axle A and the body frame B.

The shock absorber comprises a cylindrical container 1 that is adapted to be secured in a suitable manner to the axle A, and adapted to hold a quantity of oil or other suitable liquid 2. A hollow cylindrical plunger 3 is mounted for vertical movement in the open upper end of the cylinder 1, and is adapted to be secured to the body frame B in any suitable manner. Packing 4 is provided between the inner wall of the cylinder 1 and the outer wall of the hollow plunger 3. The lower end of the hollow plunger 3 designated 5, is provided with an opening 6 forming a valve seat for the valve 7 and providing communication between the cylinder 1 and the hollow plunger 3 to permit movement of the oil 2 into the hollow plunger, and valve 7 is provided with a restricted opening 8 through which the oil may pass from the hollow plunger to the cylinder 1 when the valve 7 is seated. A vent is provided in plunger 3 that is controlled by the valve 9, and valve 9 is actuated by means of a float 10 connected to the valve by rod 11 having an angular extension 12 secured to the valve.

In operation, when the spring C is compressed by movement of the body frame B toward the axle A, the plunger 3 will move downwardly opening the valve 7 and the liquid 2 will flow into the plunger 3, and when the spring C reacts the valve 7 will close and the restricted opening 8 in the valve will by limiting the movement of the oil or other liquid from the plunger to the cylinder cushion the rebound of the spring.

In event the spring C is subjected to a severe strain, the oil entering the plunger 3 will raise the float 10 and close the vent valve 9 and by compressing the air in the plunger 3 will cushion the shock of an excess compression of the spring 3.

The type of spring C selected for illustration of the application of the shock absorber is for illustration only, as it will be apparent that the device may be applied for absorbing the shock of vehicle springs of any type.

What is claimed is:

1. A shock absorber for vehicle springs, comprising a cylinder containing a liquid, a hollow cylindrical plunger operating through an open end of said cylinder and provided with an opening communicating with said cylinder, a valve to seat in said opening and having an opening therethrough, a vent valve in said plunger, and float controlled means for actuating said vent valve.

2. A shock absorber for vehicle springs, comprising an open ended cylinder containing a liquid, a hollow plunger operating through the open end of the cylinder and provided with an opening communicating with the cylinder, a valve to seat in the opening and having an opening therethrough, the plunger having a vent opening, a valve pivotally engaging the wall of the plunger and controlling said vent opening, and a float in the plunger operatively engaging the valve.

3. A shock absorber for vehicle springs, comprising an open ended cylinder containing a liquid, a hollow plunger operating through the open end of the cylinder and provided with an opening communicating with the cylinder, a valve to seat in the opening and having an opening therethrough, the plunger having a vent opening, a valve pivotally engaging the wall of the plunger and controlling said vent opening, an angular extension on said valve, and a float connected to said angular extension to actuate the valve.

In testimony whereof I affix my signature.

JAMES T. LENN.